United States Patent [19]

Long

[11] Patent Number: 5,414,954
[45] Date of Patent: May 16, 1995

[54] SELECTIVE CONTROL OF THE MOVEMENT OF CRAWLING INSECTS

[75] Inventor: Roger H. Long, Auburn, Pa.

[73] Assignee: Consep, Inc., Bend, Oreg.

[21] Appl. No.: 94,401

[22] Filed: Jul. 20, 1993

Related U.S. Application Data

[63] Continuation of Ser. No. 694,689, May 2, 1991, abandoned.

[51] Int. Cl.$^6$ .............................................. A01M 1/20
[52] U.S. Cl. ...................... 43/121; 43/132.1; 43/108
[58] Field of Search ............... 43/108, 109, 121, 124, 43/132.1, 107, 58

[56] References Cited

U.S. PATENT DOCUMENTS

| 256,561 | 4/1882 | Fuller | 43/108 |
|---|---|---|---|
| 1,814,471 | 7/1931 | Grove | 43/132.1 |
| 2,389,870 | 11/1945 | Reevely | 43/108 |
| 4,263,740 | 4/1981 | Hemsarth | 43/114 |
| 5,303,502 | 4/1994 | Metzner | 43/121 |

FOREIGN PATENT DOCUMENTS

| 1189700 | 7/1985 | Canada | 43/121 |
|---|---|---|---|
| 0160712 | 3/1984 | European Pat. Off. | |
| 2224228 | 10/1987 | Japan | 43/121 |
| 3126445 | 5/1988 | Japan | 43/121 |
| 3126448 | 5/1988 | Japan | 43/121 |

OTHER PUBLICATIONS

Article entitled "Techniques for Collecting, Rearing, and Handling Imported Fire Ants," by U.S. Department of Agriculture, Apr. 1981.

Primary Examiner—P. Austin Bradley
Assistant Examiner—James Miner
Attorney, Agent, or Firm—Chernoff, Vilhauer, McClung & Stenzel

[57] ABSTRACT

Crawling insects are caused to abandon sites they have infested or prevented from infesting other sites by preparing dispersions from selected minus 10 micron particles and forming a film on the surface to be protected. Different insects can selectively be controlled by adjustment of the particle sizes in the dispersion.

7 Claims, 3 Drawing Sheets

SELECTIVE CONTROL OF THE MOVEMENT OF CRAWLING INSECTS

This application is a continuation of application Ser. No. 07/694,689, filed May 2, 1991, now abandoned.

BACKGROUND OF THE INVENTION

1. Field of the Invention

This invention relates to methods and means for selectively controlling the movement of crawling insects and more particularly to non-toxic, non-debilitating methods and means for causing crawling insects to abandon the site they have infested or for discouraging crawling insects from infesting a site where they are not wanted.

2. Discussion of the Prior Art

The crawling insects of the type with which this invention is concerned are those which are pests or nuisances to man. These include, for example, gypsy moths that crawl from the ground up into trees to devour the leaves of the trees; cockroaches, spiders, scales and palm aphids which are often offensive in appearance and may carry and spread disease; and, perhaps the most widespread and annoying of the general group, is the ubiquitous ant. The ant exists in many forms including the destructive leaf eater, Argentine, carpenter and pharaoh ants, the termites and, of course, the militant and destructive fire ant. Fire ants may cause havoc, particularly in the warmer climates, by infesting various electrical apparatus such as transformers and switch boxes and, because of their aggressive habits and acidic residues, cause breakdowns of the insulation and destroy the electrical operation of a device. Ants may be attracted to electrical devices because of the magnetic field created by the alternating current and perhaps by the warmth and shelter provided in the interior of an electrical device.

Many pesticides and insecticides are available which will kill or disrupt the life cycle of crawling insects, but essentially all of them are environmentally objectionable because of their toxicity. Their toxicity also may be of danger to animals and humans and prevent their use in applications where the pesticides may come in contact with food or otherwise present the danger of ingestion. This prevents them from being used in applications where food may be present, such as in dining rooms, kitchens, picnic tables, pet food dishes and the like.

Pesticides and insecticides are also less than ideal in function when used in an outdoor environment in which they may be washed away or otherwise rendered ineffective when exposed to the elements.

A number of crawling insect traps are disclosed in the prior patent art that utilize surfaces that have been treated to make it difficult for insects to crawl over the surfaces. Typically, these traps have a vertically disposed surface that the crawling insects must crawl over in order to get out of the trap. By one method, a sticky substance is spread over the surface which entraps the insect, much like fly paper, or, by an alternative method, a vertical surface is made slippery to the crawling insect so that if loses its footing and slides into the trap.

An early attempt to make an insect trap with a slippery vertical surface is disclosed in U.S. Pat. No. 400,460 where there is shown a trap in the form of an open topped box fitted with inwardly and downwardly slanting sidewalls. The upper portions of the slanting sidewalls are covered with a moderately rough material, such as paint, paper or cloth, and immediately subjacent this surface is a polished surface that, it is said, causes the insect, Upon leaving the comparatively rough surface, to lose its footing, slide down the polished surface and fall into the bottom of the trap.

Variations of the U.S. Pat. No. 400,460 in which a slippery vertically disposed surface is used appear in the prior patent art in U.S. Pat. No. 1,667,048 in which a slippery glazed surface is used; U.S. Pat. No. 2,167,978 in which the vertically disposed surface is treated with a powder that adheres to and renders ineffective the cupolas and cleaving balls of insect's legs; U.S. Pat. No. 3,851,417 in which a slippery film is made from a mixture of lanolin and linseed oil; and U.S. Pat. No. 4,030,233 in which a slippery surface is provided by soaps or other fatty substances. Representative of the sticky substances method is U.S. Pat. No. 2,606,391 which discloses a hydrophilic, non-drying, high viscosity gel to entrap a crawling insect.

U.S. Pat. No. 4,263,740 is of interest since it discloses an insect trap having inwardly and downwardly sloping side walls which are covered with a loosely adhering particulate material. The particulate material is so loosely held that it will break loose and "avalanche" downward when an insect attempts to cling to it. The operation of the trap mechanism requires that the insect first crawl across the coating so that the particulate material, in the preferred range of from 100 to 300 microns, will cover and adhere to the insect's pulvilla and destroy the effectiveness of the pulvilla in sticking to a smooth surface. The patent teaches that when the insect reverses its direction in an attempt to crawl up the slanting sidewall and escape from the trap, the insect must grip the particulate material with its tarsal claws. Since the particles are only loosely adherent, they break away creating an "avalanche" that falls with the insect into the interior of the trap. The particulate material disclosed in this patent is either organic or inorganic and as examples Teflon(®), sand, clay, ground pyrophyllite, aluminum silicate, cellulosics, talc, sand, and flour are given.

Entomologists sometimes use similar techniques as discussed above relative to the prior patent art to contain their experimental insects within laboratory vessels. Thus they have coated the inside walls of their vessels with sticky substances, most commonly Vaseline(®) and mineral oil, to prevent insects from escaping but this method suffers from the fact that the insects are entrapped and die. Similarly, coatings of talc have been adhered to the side walls which prevent the escape of insects by smothering them, but this also kills the insects.

To avoid killing their specimens, entomologists have also used the slippery surface technique by coating the interior side walls of vessels in which they keep their experimental insects with water dispersions of polytetraflouroethylene. After one or more coatings are applied as by painting a wide band on the side walls, many crawling insects are unable to climb the side wall and are thus contained within the vessel. These coatings are fragile and do not adhere well to the side walls which restricts their utility to the controlled environment of a laboratory where the coating can be protected from accidental damage as by scratching or bumping. It can be understood that if a portion of the coating cracks or is sloughed off, sites are established which enable an insect to obtain a grip and advance up the side wall of the vessel. Further, when exposed to water, these slippery coatings wet out and lose their effectiveness in preventing the escape of insects. To overcome these shortcomings, the slippery coatings which have been used by entomologists require frequent renewal and they are applied in very wide bands, relative to the length of the insects, to make up for the imperfections that develop in the coatings.

The present invention is related to the above described prior art in that it relies upon skewed treated surfaces to prevent the movement of crawling insects over the surfaces but, unlike the prior art devices, selectively controls the movement of different sized insects and, rather than confining the insects within a given trap or perimeter, either prevents the crawling insects from entering a given area that is to be protected or causes the crawling insects to abandon an area which they presently are inhabiting.

The methods and means of the present invention also represent an advance over the prior art in that the coatings are more adherent to their substrates, they are more durable and longer lasting, they are less subject to losing their effectiveness due to the effects of water, they can be more readily and efficiently applied and they do not have to be applied in bands as wide as those of the prior art to ensure their effectiveness.

The present invention is further distinguishable from the prior art in that it discloses coating formulations and methods for their application that greatly increase the effectiveness of the methods used by the prior art to contain or trap insects.

Accordingly, it is an object of this invention to prevent crawling insects from infesting certain areas.

A related object of this invention is to cause crawling insects to abandon an area which they have previously infested.

Another object of this invention is to protect areas from infestation from crawling insects without using insecticides or toxic substances that may be harmful to the environment.

Another object of this invention is selectively to control the type or size of crawling insects which enter or leave an area.

Another object of this invention is to control the movement of crawling insects without harming the environment or injuring the insect.

Another object of this invention is to provide for the creation of an environment which is not hospitable to crawling insects and cause them to leave and establish their nests elsewhere.

Another object of this invention is to provide coating formulations and methods for their application which will control or induce the movement of crawling insects.

Another object of this invention is to provide wearing apparel such as shoes and boots, ankle protectors, outer garments and the like which will prevent crawling insects from climbing onto the human body.

Another object of this invention is to prevent insects from crawling up the legs of furniture.

Another object of this invention is to provide methods and means for the control of the movement of crawling insects which are simple to use, are effective in relatively small amounts, remain effective over prolonged periods of time, are capable of withstanding moderate abuse, and are not rendered ineffective when contacted with water.

Another object of this invention is the provision of methods and means to control the movement of crawling insects that are capable of use in an exposed, outdoor environment.

Another object of this invention is to preserve the operational effectiveness of the electrical contacts in various types of electrical devices by preventing them from being overrun with insects.

Another object of this invention is to provide a liquid and a method of spraying it onto a surface in order to form an adherent film that is uniform in thickness and will not crack or crater.

These and other objects of this invention are achieved by dispersing finely divided, non-tacky particles of less than about 10 and preferably less than about 0.5 microns in a liquid; spraying or otherwise applying a smooth, continuous, holiday and bubble free coating of the dispersion over a surface; and drying the dispersion to form a coherent film which cannot readily be washed or wiped away. As is discussed in more detail below, a surfactant is often helpful in establishing the dispersion even though, in many applications of this invention, it may prove desirable to wash the film after it has been formed and remove residual surfactant from the film.

In the practice of this invention it has been found that crawling insects, such as ants, termites, gypsy moths, cock roaches and the like cannot climb on the coated surfaces when the surfaces are set at an angle to the horizontal. The minimum angle required to impede the progress of an insect over a surface coated in accordance with this invention is not a precise number of degrees as it will vary with the characteristics of the insect such as its size, whether it has any sticky substances on its legs, whether its tarsi have claws, and in the case of crawling pests such as caterpillars, how many legs it has. Nonetheless, as a generality, it may reasonably be estimated that surfaces treated in accordance with this invention should be skewed at least about 20 degrees to a horizontal axis to be effective. For purposes of this specification and the appended claims, the term "skewed surface" will be used to describe a surface that makes at least a 20 degree angle with the horizontal plane.

By way of example, if it is desired to keep gypsy moths out of a tree, the trunk of the tree may be coated with a circumferential band of the film forming substance of this invention. It has been found that when a surface to be treated is either too rough or porous, like the bark of a tree or the surfaces of wood, bricks, cinder blocks or the like, it is difficult to coat the bark (or other rough or porous surfaces) and effectively prevent insects from climbing the tree. This problem may be overcome by several means including painting the bark of the tree at the area to be treated with a sealant to provide a better surface to which the film forming material of this invention can be adhered. By another means, the film-forming materials may be first coated on the surface of a flexible base material which is then tightly wrapped around and adhered to the bark. And yet by another method a flexible web of material is adhered to the bark of the tree and the web is then sprayed or otherwise coated with the film forming suspension. One particularly convenient and effective material to use as a flexible web is cloth backed duct tape. It is intended that all of the above techniques are included within the scope of this invention.

It has been observed that the surface characteristics of the film forming materials of this invention may change when the film becomes wet with water. When a surface which has been prepared in accordance with this invention is exposed to the outdoor elements like snow, rain or high humidity, it may rewet and lose its effectiveness in preventing insects from crawling on its surface. It is believed that the tendency of the film to rewet is function of the surfactant used in preparing the dispersion and it has been established that the problem can be overcome either by not using a surfactant, by the selection of an appropriate surfactant or by removing the surfactant after the film has been formed. Some surfactants are naturally destroyed by exposure to the outdoor environment and UV light and others may be leached out of a film by washing the film with a suitable solution which, depending upon the surfactant, may include water, alcohols, acids, bases and the like.

The proper selection of the surfactant is initially of concern to obtain a uniform dispersion of the fine particles. The selection of the surfactant is important because it will influence the properties of the dry film including the strength of the film, the adhesion of the film to a surface, and the ease with which the film can be rewet. Further, if the dispersion is applied to a surface by use of an aerosol spray, care must be taken in selecting a proper propellent for use with a given surfactant since some combinations of propellent and surfactant result in the destruction of the dispersion.

The materials that may be used to form the dispersions of this invention must generally be less then 10 microns in diameter and preferably less than 1 micron to insure the formation of a film. (Here and elsewhere in the specification and claims, the dried residue that results when a dispersion of this invention is applied to a surface is referred to as a "film" since it appears to the naked eye to be continuous and since it is known that it will be effective in controlling the movement of insects only if it is free from discontinuities that can present a gripping point to an insect. On the other hand, this "film" may have little or no tear strength and, unless applied to an adhesive substance as is discussed below, the dried coating can not be peeled away from a surface without destroying the "film". For this reason, and since a better term does not come to mind, it should be understood that the term "film" as used herein may not be entirely consistent with some definitions of the term.)

It is important that the small particles selected for use with this invention do not have surface tack in the sense that they afford an adhesive point to help an insect traverse a treated surface.

The above criteria greatly limit the materials that are available for use in this invention. One suitable group of finely divided particles that have been found useful in the practice of this invention are synthetic plastics that can be prepared directly in minus 5 micron particle sizes as by suspension polymerization or dissolution and precipitation processes. It should be understood that, as a practical matter, it is difficult to grind plastic materials to the small particle size required in the practice of this invention. With this in mind, one class of materials that is particularly suitable for use in the this invention are the fluorinated hydrocarbons which can be prepared by suspension polymerization. This group includes polytetrafluoroethylene (PTFE), fluorinated ethylene-propylene (FEP) and perfluoroalkoxy (PFA). Suspension grades of fluorinated hydrocarbons are commercially available with maximum particle sizes of about 0.5 microns and others with average particle sizes of less than 0.2 microns. Since the fluorinated hydrocarbons have low coefficients of friction and are slippery to the touch they are most useful materials for use in the practice of this invention.

Other materials which are effective in the practice of this invention include suspension grade acrylics, precipitated nylons and inorganic materials with generally smooth surfaces that are available in diameters of less than about 5 microns. Examples of inorganic materials include powdered aluminum silicate, talc and carbon black.

As will be discussed in greater detail in the Examples that follow, there is a correlation between the particle size of the materials comprising the film and the size of the insect that can traverse its surface. As a general rule, the smaller the insect the smaller must be the size of the particles. As an example, if a mixture of 0.2 micron PTFE and 5 micron aluminum silicate particles are used to form a film, small ants can not crawl up the film whereas cockroaches can. If, on the other hand, the film is made entirely from 0.2 micron particles of PTFE, neither ants nor cockroaches can scale the film.

It has also been observed that certain crawling insects, particularly ants, find it necessary to crawl up onto the top surface of the mounds they build. If a number of stones, or relatively smooth, small rounded particles of most any material, are coated with a film of this invention and laid over on the top of an ant mound, the ants will desert the area and move their colony elsewhere. The same effect can be achieved if ceratin coated mechanical structures with skewed surfaces, such as of an egg crate design, are placed on the top of an ant hill. (For convenience, the stones, round particles and mechanical structures with skewed surfaces coated in accordance with this invention for placement on the top of present or prospective ant hills are sometimes hereinafter collectively referred to as "stones"). While the phenomena is not understood, it is presumed that the ants become frustrated when they are unable to climb and carry small particles over the stones to increase the height of their mound.

The above discovery can be utilized to considerable benefit where it is important to exclude ants from a location because of the mounds they build. Thus in the case of a ground level pad which supports an elevated transformer, a coating can be applied to the vertical cables or conduits leading from the ground upwardly to the transformer to prevent ants from climbing up the cables or conduits into the transformer. However, since the ants can still nest in the housing at ground level and erect mounds that potentially may obstruct auxiliary devices, a layer or two of round particles, such as small stones, can be distributed within the base of the pad and coated with the dispersions of this invention. In this manner the ants can neither climb the cables nor build mounds within the housing.

Another example of the benefit of placing stones with treated surfaces on the top of ant hills can be found in water meters that are located in housings at or slightly below ground level. These housings are often infested with ants which build large mounds that can completely cover the face of the water meter and prevent readings from being taken. The ants can be caused to leave the housing (or not enter it in the first instance) if smooth shaped articles, such as stones, are treated with the dispersions of this invention and placed within the housing in surrounding relationship to the water meter. Apparently, since the ants can't climb up onto the surface of the coated shaped articles carrying dirt with them to build a mound, they become frustrated and leave.

DETAILED DESCRIPTION OF THE DRAWINGS

Figure 1:
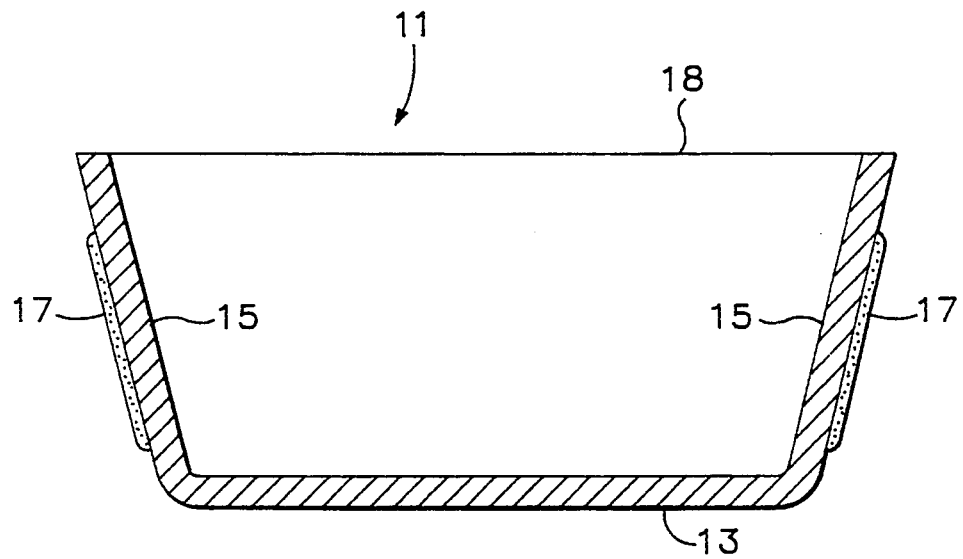
FIG. 1 is a sectional view of a pet dish adapted for use in the practice of this invention.

FIG. 1 illustrates this invention as used to protect a pet food dish 11 from an incursion of crawling insects and, in particular, ants. The pet dish 11 is comprised of a base 13 and a side wall 15. A portion of the side wall 15 is shown coated with a film 17 formed in accordance with this invention extending around the entire periphery of the pet dish 11. This film will prevent ants and other crawling insects from climbing up the sidewall 15 and into the dish 11.

In a similar manner as illustrated in FIG. 1, a film of material may be laid around the periphery of many different objects in order to prevent insects from crawling up the periphery of the objects. While not shown in the drawings, it can be understood that the invention as illustrated in FIG. 1 can be used on such objects as the legs of lawn chairs and tables, the outside wall of buckets or other containers, around the handles of garden tools, on the pedestal of a portable outdoor grill, on the wheels of a baby buggy, and so on almost without limit.

In a similar manner the invention can find utility in preventing insects from crawling on animals and humans. Thus one aspect of the invention lies in applying films to articles of wearing apparel including boots and shoes, ankle protectors, outer garments such as overalls, decontamination gear and such like. The films of this invention also may be applied to mats, platforms, outdoor furniture and other articles that are design to rest on or be supported by the ground.

Figure 2:
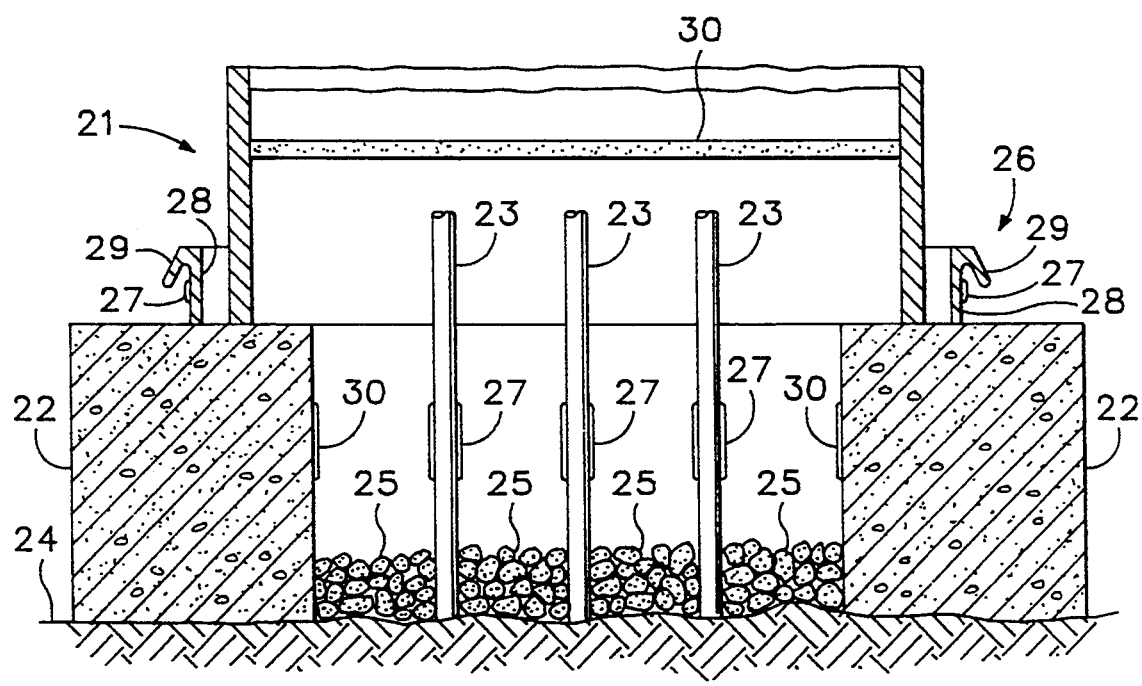
FIG. 2 is a cut away and somewhat schematic view of the lower portion of an electrical device mounted on a ground level pad.

In FIG. 2 there is shown a schematic cutaway view of the lower side wall 21 of an electrical device, such as a switch box, transformer, junction box or the like, mounted on a cement pad 22 which rests on the ground 24. Cables 23 pass upwardly through the ground 24 into the interior of the device. Shown mounted on the cement pad 22 is a protective sleeve 26 that surrounds an exterior portion of side wall 21 of the electrical device. The protective sleeve 26 is comprised of an upstanding wall 28 and an outwardly and downwardly directed protective flange 29 mounted on the top edge of the wall 28.

A coating 27 is illustrated as having been applied as a circumferential band to the cables 23 and to an upper portion of the wall 28. Note that the coating 27 on the wall 28 of the sleeve 26 is protected, at least in part, from the elements by the down turned flange 29.

While the sleeve 26 is here illustrated for use with an electrical device, it has general applicability whenever it is desired to protect the coating from the outdoor environment or to protect it from mechanical damage as by scratching, bumping or other mishandling.

A protective sleeve such as illustrated in the drawings may also provide a mechanism by which the film of this invention can be applied to an object. It is within the scope of this invention to coat continuous lengths of a pressure sensitive tape with the dispersions of this invention and then unwind the tape and wrap the tape around and adhere it to any surface that is to be made resistant to the movement of crawling insects. This is a convenient way in which to adhere a protective coating to the trunk of a tree, to a cement or wooden surface, to the legs of a wooden picnic table and so on and so on.

Again referring to FIG. 2, it is illustrated that the side walls of the cement pad 22 as well as the lower side walls 21 of the electrical housing are coated with a band 30 of a protective film applied from a dispersion of this invention. Since the cement pad 22 is porous, a sealant should first be applied to its surface before the band 30 is coated on the surface or, in the alternative, a coated pressure sensitive tape as discussed above can be used.

The cables 23 are surrounded at ground level 24 with a layer of stones 25 which have been coated with a film prepared in accordance with this invention. The stones 25 fill the entire spaces between the cables 23 and the wall 28 so that insects can not build their mounds within the confines of the cement pad 22. Further, to the extent that any ants may succeed in entering the electrical device 21, they will be unable to climb the cables 23 past the protective coating band 27.

Many different types of electrical devices are natural targets for infestation by ants. These include ground landing lights at airports, television and telephone junction boxes, patio lights, traffic signal controllers, transformers of all sorts including both ground level and pole mounted, etc. A special problem is presented with such electrical devices if they have electric contacts or breakers designed to control the flow of electricity. If the ants overrun the surfaces of the contacts, it is not uncommon to find that the device malfunctions or is made inoperative. These problems can largely be avoid in the practice of this invention if care is taken to apply an insect controlling film barrier to the inside walls of these electrical devices, to the wires within the devices that rise vertically from the ground and to stones placed over the bottom surface of the electrical device.

Figure 3:
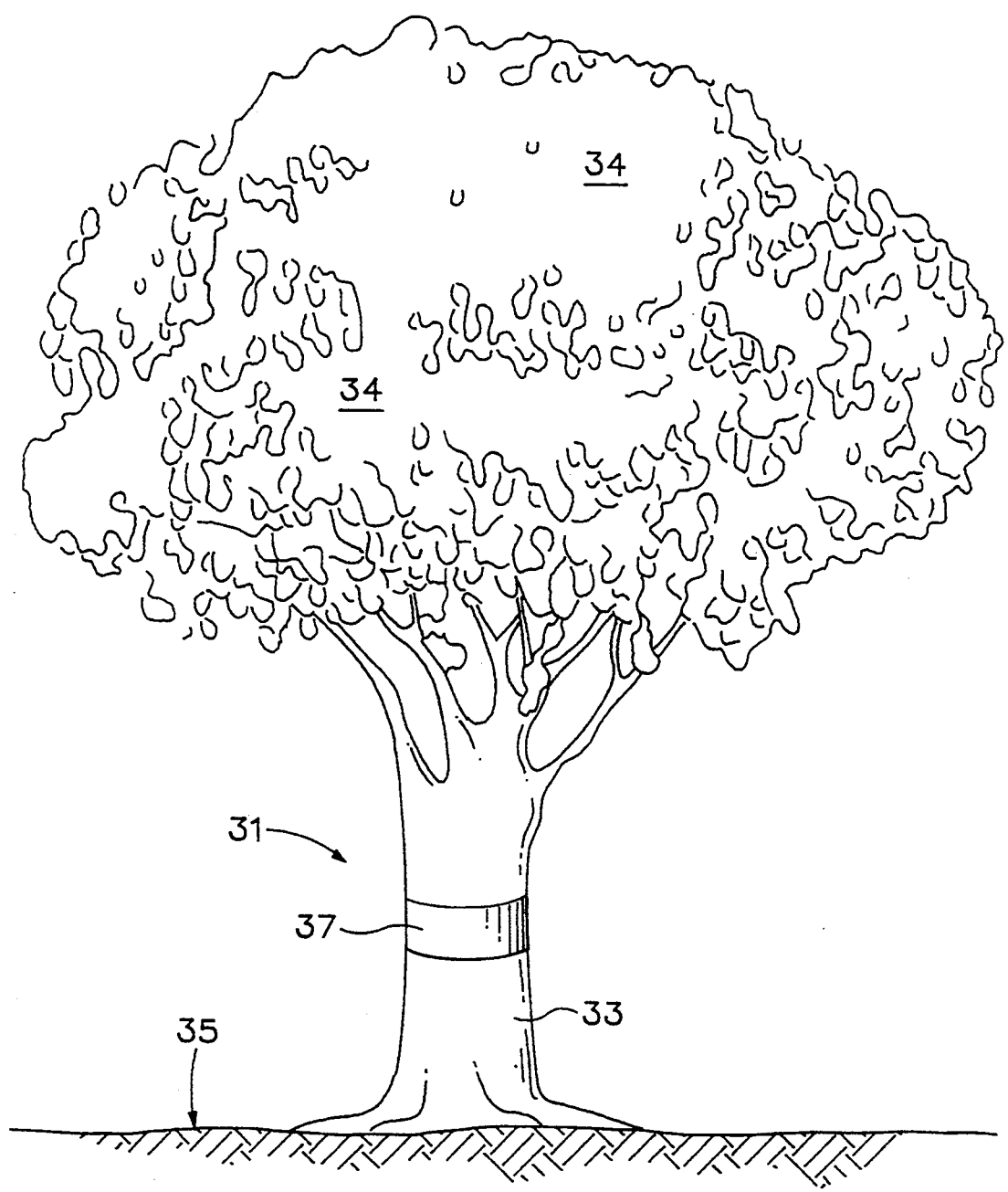
FIG. 3 is a schematic illustration of the trunk of a tree having a protective band applied in accordance with this invention.

FIG. 3 is a schematic illustration of a tree 31 with its trunk 33 rising above the ground 35. To prevent crawling insects, gypsy moths for example, from climbing up the trunk 33 and infesting and eating the leaves 34 of the tree 31, a protective band 37 is shown adhered to the circumference of the trunk 33. The protective band 37 may be a strip of cloth backed, pressure sensitive duct tape which has been securely pressed against and adhered to the trunk 33 of the tree 31 thus providing a barrier to prevent crawling insects from climbing the tree 31.

Figure 4:
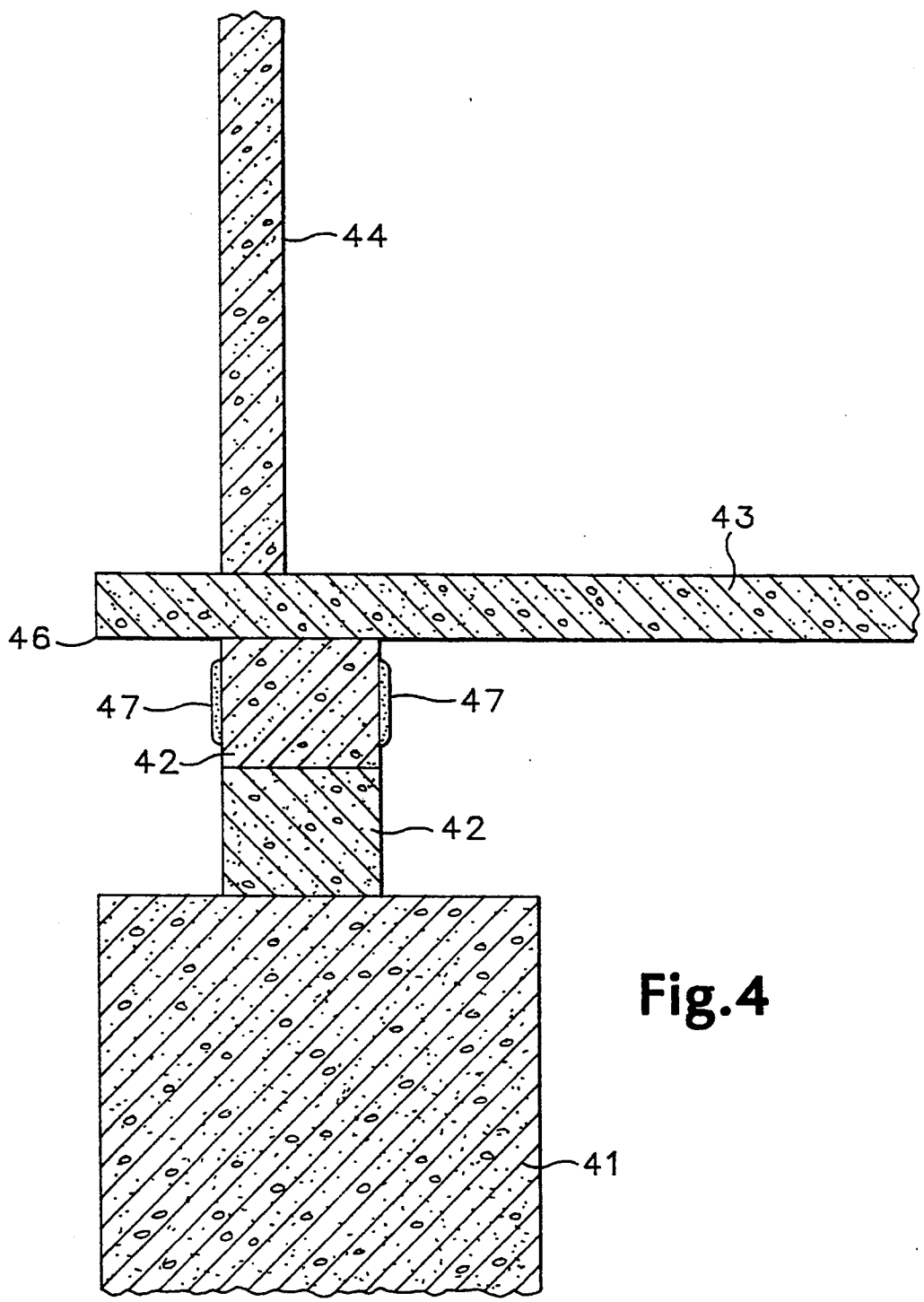
FIG. 4 is a sectional view of a small portion of a building showing the foundation and first floor at ground level.

FIG. 4 is an illustration of the invention as used to protect a building from infestations by crawling insects, particularly ants and termites. Here there is rather schematically illustrated a small portion of a building at ground level. A concrete support pier 41 supports two courses of concrete blocks 42. Mounted on the concrete blocks 42 is a concrete pad 43 that serves as the ground floor of the building. As illustrated in the drawing, the pad 43 has an overhang 46 that extends slightly outboard and beyond the concrete blocks 42. An outside wall 44 is mounted on the slab 43 and extends therefrom in an upwardly direction.

To protect the building from the entry of crawling insects, a film 47 has been affixed to the exposed sides of the concrete block 42. As discussed in connection with the film 37 attached to the tree 33 in FIG. 3, the film 47 may be sprayed directly onto the block 42; it may be sprayed onto a base coat previously applied to the block 42; it may be applied to a tape previously adhered to the block 42; or the film 37 may be pre-coated onto the surface of a tape which is subsequently affixed to the block 42.

As illustrated in FIG. 4, the film 47 is protected from abrasion, the weather, rain and UV light on one side of the block 42 because of the overhang 46 and on the other side of the block because it is entirely protected within the building structure. If this were not the case a protective device such as the sleeve 26 illustrated in FIG. 2 would be used to afford protection to the film 47.

In the above illustrations of the utility of this invention, vertical surfaces were coated with a film to prevent the movement of crawling insects. The width of the applied film is important since it must be wider that the length of the insect. Otherwise the insect can extend its body length over the width of the film and continue on its way. In the special case of ants which are able to build a pyramid with their bodies when the occasion demands, the width of the protective film must be considerably wider than the length of the body of an ant to prevent the ants from making a bridge around and over the film. For this reason, the width of the film should exceed the length of the insect by several fold, depending, of course, on the agility and cooperative abilities of the insects that are being controlled.

EXAMPLES

In the Examples that follow, the dispersions were prepared by adding the ingredients together and mixing them well by mechanical agitation. A Waring type blender is well suited to this purpose although other mechanical mixing devices can be used. In the Examples, the quantities are given by weight unless otherwise noted.

EXAMPLE I 100 grams of aluminum silicate were dispersed in 200 grams of water and 4 grams of a surfactant. The aluminum silicate had a particle size of about 5 microns and was obtained from R. T. Vanderbuilt. The surfactant is sold under the trade name Darvan(®) #2 by the R. T. Vanderbuilt Company and is described as being a sodium salt of benzoid alkylsulphonic acid.

The above dispersion was sprayed onto a glass plate in a 5 centimeter band using a pump type sprayer. After the water evaporated, a coherent film was left on the glass plate where it had been sprayed.

The glass plate was placed in the proximity of ants and it was found they could climb up and over the film when the glass plate was held in a vertical position. On the other hand, when the glass plate was exposed to roaches and caterpillars, it was found that these larger insects were restrained as they could not climb over the film. It is believed that the size of the particles that comprise the film is related to the size of the insects that can or can't climb on the film. Presumably small insects like ants can get a foothold on 5 micron glass particles whereas larger insects such as roaches cannot. If the particle size is as small as 0.5 microns, however, neither of these insects can climb on the surface of the film.

EXAMPLE II

The same experiment was repeated with a finely divided nylon made by a precipitation process and sold under the tradename Nylasint(®) by The Polymer Corporation being substituted for the aluminum silicate. Again it was found that when a narrow band of the dispersion was sprayed onto a glass plate, ants could climb up the deposited film, but larger insects such as roaches and caterpillars could not.

Examples I and II are of interest because they demonstrate the utility of this invention in selectively controlling the movement of different kinds of insects. An illustrative example of when it may be advantageous to exclude one insect while permitting the passage of another is the protection of trees from caterpillars that climb up the trunks of the trees and gorge themselves on the leaves. By using coatings such as disclosed in these first two Examples, the caterpillars can be prevented from climbing trees while, on the other hand, ants will be able to climb the trees to protect the trees from other insects such as seed feeding beetles.

EXAMPLE III

The experiment of Example I was again repeated, but his time titanium dioxide was used in place of the aluminum silicate. The titanium dioxide was obtained from the DuPont Company and it is described as being of an average particle size of about 2 microns. As in Examples I and II, a coating of this material was effective in restraining the movement of roaches but did not impede the movement of ants.

EXAMPLE IV

As a general rule, the more effective the surfactant is to promote adhesion, the greater is its capability to rewet when exposed to water. Since it has been discovered that insects can crawl up surfaces coated in accordance with this invention if the surfaces are wet, it is obvious that it is preferred, particularly for outdoor applications, that the surfaces do not rewet in the presence of water. On the other hand, if all of the surfactant is removed from the applied film, a substantial loss of adhesion occurs. It accordingly becomes necessary in the practice of this invention to balance the adhesion of the film against the tendency of the film to rewet to accommodate particular uses. As a generality, it is thought better to use surfactants that promote good adhesion and wash them away after the film is formed than it is to use surfactants that poorly promote adhesion and let them remain on the dried film.

In this Example PTFE dispersions were prepared using several different surfactants and films were formed by spraying the dispersions on a glass plate and allowing them to dry. It was found that, as discussed above with regard to reweting of a film, a balance must be achieved between good and bad adhesion. On the one hand, good adhesion is a desirable property since it yields a film that is more durable, that will weather better and that will last longer. On the other hand if the film is too tightly adhered to its substrate, it has been found that it will be ineffective in preventing the movement of insects up its surface.

Taking the extreme case in which a film is fully fused over and bonded to a substrate, the film will not control the movement of insects no matter how smooth or slippery the film is. This can be demonstrated with a kitchen utensil which has been coated with PTFE to form a non-stick surface. It can be shown that insects have little difficulty in climbing up this type of surface.

At the other extreme, if a surface is merely dusted with a fine powder, such as flour which has little or no adhesive affinity for the surface, the same result is noted in that insects can climb the dusted surface. It is therefore important, in the practice of this invention, to select a surfactant, if one is used, that will provide sufficient adhesion to prevent the movement of insects over a selected surface while, at the same time, will provide enough adhesion to preserve the integrity of the film under the conditions of intended use.

With the foregoing in mind a finely divided PTFE was dispersed using several different surfactants to form a dispersion having about 30% solids content and the adhesion of the dispersion was noted when it was sprayed on a glass plate.

The least effective of the surfactants in promoting adhesion of the surfactants tested was Darvan(®) #2. The adhesion of the film was materially improved when Triton(R) X-100 as sold by Rohm and Haas (described as octyl and nonyl phenoxypolyethoxyethanol) was used and even better adhesion was obtained when a mixture of Triton(®) X-100 and Zonyl(®) FSN from DuPont (described as perfluoroalkyl ethoxylate) was used.

EXAMPLE V

It is of considerable importance that the films of this invention be smooth and continuous without holidays, bubbles, blisters, mud cracks and the like if they are to be effective in preventing the movement of insects. This experiment demonstrates the importance of applying a film in a manner in which the desired smooth and continuous coating can be obtained.

A dispersion was prepared by the method of Example I using 60% of a minus 0.5 micron PTFE dispersed in about 33% water using about 7% Zonyl(®) FSN (DuPont) as the surfactant. This dispersion was first applied to a glass surface by spraying, as in Example I, and next it was applied to a glass surface with a small paint brush. After the surfaces had dried, it was observed that the coating that was brushed on was not nearly as smooth as was the coating that was sprayed on. In addition to surface irregularities, small bubbles and other discontinuities were seen in the brushed on coating. In contrast, the sprayed on coating appeared to be much smoother and had no visible bubbles or discontinuities.

When the coatings were placed in the vicinity of an ant colony, the ants were unable to climb up the sprayed coating but, with some difficulty, were able to climb the coating that was applied with a brush. Presumably the ants were able to obtain a grip on the painted surfaces where bubbles and other irregularities were present.

EXAMPLE VI

A number of tests were performed to observe the effect of changing the solids content of the dispersions. As a generality it was observed that a higher solids concentration was required when the dispersions were sprayed on rough or irregular surfaces as compared when sprayed on smoother surfaces. Thus when a pile of stones was placed over an ant hill, it was found that the effectiveness in causing the ants to abandon their hill was improved when the solids concentration of the finely divided PTFE was at about 60%. As a practical matter this is about as high as one can go in solids loading while maintaining a stable dispersion that will not readily separate.

By comparison, when a smooth glass plate was sprayed to form a coating, a film effective to prevent the movement of ants (but not roaches) was sprayed on from a dispersion in which the solids content of the dispersion was only about 15%.

From the foregoing it was concluded that a 60% solids dispersion is effective against all insects even on somewhat irregular surfaces but that a 15% solids dispersion is somewhat more limited in application and can only be used on smoother surfaces to control smaller insects. However, for cost effective purposes, it is preferred to keep the solids concentration as low as possible for any given application.

EXAMPLE VII

As a has been discussed above, the width of the film relative to the length of the insect is of some importance. It is rather obvious that the film must be wide enough to prevent the insect from reaching or stretching over the film and thus the width must exceed the body length of the insect. Some allowance must be made for the agility and persistence of an insect but it has been found in working with roaches and caterpillars, that if the applied film is about twice the length of the insects body, it is a fairly safe assumption that the insect will not be able to climb over the width of the film.

A notably exception to this generality exists in the case of ants. As mentioned above the social ability of ants to work together enables them to build pyramids with their bodies in order to make a "ladder" and climb higher. This must be taken into account if the film is applies at ground level or at any other location where the ants can make a pyramid out of their bodies to bridge over the width of the film.

EXAMPLE VIII

In Example V. comparisons were made between films applied by spraying and those that were applied by a brush. It was demonstrated that the smoothness and integrity of the applied film is of great importance in preventing insects from getting a purchase on a discontinuity in the film. In a similar manner, it is important that the applied film does not form "mud" cracks or develop fissures as it dries.

It has been determined that the tendency of a film to form mud cracks is a function of the thickness of the film, the size of the particles that make up the film and the number of layers of a dispersion that are applied to constitute the film. As a generality it may be said that single layers of a dispersion are less subject to mud cracking than are multiple layers and are therefore to be preferred.

A comparison was made between a general purpose PTFE dispersion sold by DuPont under its trade designation Teflon(®) 30 that has particles less than about 0.5 microns and a PTFE dispersion sold by DuPont under its trade designation Teflon(®) TE-3170 that has an average particle size of about 0.18 microns.

It was found that when the 0.5 micron PTFE was used to cast a film, a dry film of about 1 mil could be applied to a surface without cracking occurring. On the other hand when the TE-3170 was used, it was necessary to limit the dry film thickness to about 0.5 mil to prevent cracking. It is believed that this difference is due to the way the smaller particles pack together when the wet film dries.

The above demonstrates the importance of applying thin films, e.g. 1 mil or less, with commonly available dispersion grades of PTFE in order to obtain a crack free surface. As a practical matter this limits the methods by which the dispersions can be applied to a surface since a uniform film of the desired thickness cannot be applied with a brush and must be applied methods such as by spraying the dispersion onto a substrate or dipping the substrate into the dispersion.

EXAMPLE IX

In preparing the films of Example VIII, not only was the effect of the particle size relative to the thickness of the non cracking coating noted but it was also discovered that when the solids concentration of the Teflon(®) 30 was reduced from about 60% as purchased to about 30%, the applied film was not only thinner, as was to be expected, but also the film appeared to be more tightly adhered to the glass plate, it was very smooth and it was free from mud cracking. One of the significant aspects of this is that the more dilute Teflon(®) 30 can be over coated with a second coating without cracking. This is not true of the finer TE-3170 which cracks excessively if two coats of the dispersion are applied to a glass plate. As it is to be expected that many persons who attempt to practice this invention by spraying a dispersion onto a surface will spray over a previously coated surface to be certain that no area is left exposed, a more forgiving dispersion that will allow for multiple coats without cracking can be formulated with the larger particles of the Teflon(®) 30 using a solids concentration of about 30%

Another useful method of preventing mud cracking and avoiding uneven surfaces, such as those having orange peel effects, is to formulate the dispersion of this invention to include additives that will enhance the continuity and smoothness of the film. These additives are well known in the coating art and are generally referred to as flow promoters, anti-cratering agents, anti-cracking agents and such like.

The films of this invention have also been found useful in preventing insects, such as wasps, from building nests. When the dispersions are sprayed onto a surface, it apparently becomes difficult for the insects to attach their nests to the surface. In a like manner, spiders are unable to secure their fibers to the treated surfaces and so are unable to spin webs from these surfaces. It is within the scope of this invention to use the above described methods and means to prevent wasps and similar insects from building nests and to keep spiders from spinning webs in locations where they are not wanted.

Several different methods were discussed above to describe how to adhere a film of this invention a substrate. One technique which has utility is to apply a base coat over the substrate and then spray the dispersion over the base coat. The base coat may be a sealant used to cover porous or rough surfaces. This technique is useful if the surface to be coated with a film is porous like wood, cement or brick and sealants like paint, shellac, cinder block sealants, epoxies and macadam sealants may prove suitable in different applications.

Another type of base coat which usefully may be applied to prepare a substrate to receive a film better is a solvent based contact cement. While as mentioned above the films of this invention lose their effectiveness in controlling insects if they are too tightly adhered to a surface, contact cements seem to adhere the films in a most useful manner. It is believed that one of the reasons that contact cements work so well is that most of them have a permanent tack (pressure sensitive) and do not dry to a hardened layer as do ordinary pastes and glues.

It is generally difficult to adhere the films of this invention to smooth or glossy surfaces such as acrylic or aluminum foil. However, by applying a base coat of a contact cement to these smooth surfaces before spraying them with a dispersion, good adhesion can be obtained, surprisingly without inhibiting the insect controlling properties of the film applied over the contact cement.

Another method by which the adhesion of the film to various surfaces can be improved is through the use of dispersions that incorporate adhesion promoting materials. One commercially available product that performs very well in providing good, long lasting adhesion is a PTFE dispersion sold by DuPont under its trade designation 30B. This product is described as a PTFE dispersion containing an adhesive agent.

Several different methods may be used to spray the dispersions of this invention onto a surface as for example, using a hand pump. Spray aerosols contained in a pressurized can are also convenient but care must be taken in selecting the propellant that is used. It has been found that many of the common propellants, such as the Freon(®) apparently react with dispersions and it has been found that they cause an unacceptable amount of foaming when an attempt is made to spray with them. The use of cationic propellants may also be undesirable as they break down the dispersions and cause the fine particles to settle out of the dispersion.

Spray devices are now available which separate a gas under pressure from the liquid to be sprayed by means of a flexible, elastic membrane. These devices are advantageous to use in the practice of this invention since the propellant gas under pressure is isolated from the dispersion and thus there is no problem with the selection of a propellant that is compatible with the dispersion and its surfactant.

It is sometimes useful to include coloring materials, such as pigments and dyes, in the dispersions of this invention so that the applied films are more readily visible. The films of this invention can be almost water clear, especially when they are applied in less than 1 mil thicknesses and from dispersions having low solids concentration. It is not always easy to determine if a continuous film of this kind has been formed and the inclusion of a colorant will allow one to see where he has sprayed and so avoid spraying the same spot more than once and building up a thicker film thickness that is desired.

In the examples that were given above, the dispersions were all formed with a water base. Good results have also been obtained using organic liquids including volatile solvents. One advantage of using a volatile solvent lies in the fact a surfactant may not be needed to form a stable dispersion and the re-wetting problems referred to above will can be avoided. A solvent based dispersion of PTFE particles that is available in the market and works well in the practice of this invention is sold under the trade designation F&F 933P 102A5 by DuPont.

I claim:

1. In a method for restricting crawling insects from climbing on a skewed surface comprising forming an adherent, continuous, substantially uniformly thick coating on said surface by applying thereto a dispersion of minus 0.5 micron poly(tetrafluoroethylene) particles in a liquid, the improvement comprising the use of a dispersion having a solids content of not more than about 30 wt % and applying said coating in a thickness not exceeding 1 mil.

2. A method of restricting crawling insects from climbing on a skewed surface comprising forming an adherent, continuous, substantially uniformly thick coating on said surface by applying thereto a dispersion of minus 10 micron titanium dioxide particles in a liquid.

3. The method of claim 1 or 2 wherein said dispersion is applied to an elongated strip of material that is in turn secured to a skewed surface.

4. The method of claim 3 wherein said elongated strip of material is first coated with a contact adhesive.

5. The method of claim 1 or 1 wherein said crawling insects are cockroaches.

6. The method of claim 1 or 2 wherein said skewed surface is first coated with a sealant.

7. The method of claim 1 or 2 wherein said skewed surface is first coated with a contact adhesive.

* * * * *

UNITED STATES PATENT AND TRADEMARK OFFICE
CERTIFICATE OF CORRECTION

PATENT NO. : 5,414,954
DATED : May 16, 1995
INVENTOR(S) : Roger H. Long

It is certified that error appears in the above-indentified patent and that said Letters Patent is hereby corrected as shown below:

Col. 1, line 63:   after if insert -- it --.

Col. 2, line 5:    delete "Upon" and insert -- upon --.

Col. 5, line 31:   delete "then" and insert -- than --.

Col. 5, line 62:   after "use in" delete "the".

Col. 7, line 47:   after "that are" delete "design" and insert -- designed --.

Col. 8, line 42:   delete "avoid" and insert -- avoided --.

Col. 9, line 24:   delete "that" and insert -- than --.

Col. 10, line 28:  delete "his" and insert -- this --.

UNITED STATES PATENT AND TRADEMARK OFFICE
CERTIFICATE OF CORRECTION

PATENT NO. : 5,414,954
DATED : May 16, 1995
INVENTOR(S) : Roger H. Long

It is certified that error appears in the above-indentified patent and that said Letters Patent is hereby corrected as shown below:

Col. 12, line 19:   after "As" delete "a".

Col. 12, line 31:   delete "notably" and insert -- notable --.

Col. 12, line 36:   delete "applies" and insert -- applied --.

Col. 13, line 55:   after "invention" insert -- to --.

Col. 14, line 48:   delete "from" and insert -- form --.

Col. 14, line 53:   delete "that" and insert -- than --.

Col. 14, line 60:   delete "can".

Col. 16, line 6:    delete "1 or 1" and insert -- 1 or 2 --.

Signed and Sealed this

Twelfth Day of September, 1995

Attest:

BRUCE LEHMAN

*Attesting Officer*        *Commissioner of Patents and Trademarks*